US009869057B2

United States Patent
Higuchi et al.

(10) Patent No.: US 9,869,057 B2
(45) Date of Patent: Jan. 16, 2018

(54) DEFIBRATION UNIT

(71) Applicant: SEIKO EPSON CORPORATION, Tokyo (JP)

(72) Inventors: Naotaka Higuchi, Fujimi-machi (JP); Toshiaki Yamagami, Nagano (JP); Nobumasa Abe, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/473,882

(22) Filed: Mar. 30, 2017

(65) Prior Publication Data
US 2017/0204562 A1 Jul. 20, 2017

Related U.S. Application Data

(63) Continuation of application No. 15/219,990, filed on Jul. 26, 2016, now Pat. No. 9,643,339, which is a
(Continued)

(30) Foreign Application Priority Data

Oct. 9, 2013 (JP) ................................. 2013-211677

(51) Int. Cl.
*B02C 18/00* (2006.01)
*D21D 5/24* (2006.01)
(Continued)

(52) U.S. Cl.
CPC .................. *D21B 1/06* (2013.01); *B02C 4/00* (2013.01); *B02C 18/141* (2013.01);
(Continued)

(58) Field of Classification Search
CPC ........... B02C 7/12; B02C 18/062; B02C 1/00; B02C 4/00; B02C 7/00; B02C 7/02;
(Continued)

(56) References Cited

U.S. PATENT DOCUMENTS

| 2,785,865 A | 3/1957 | Berling |
| 3,346,197 A | 10/1967 | Sagar |

(Continued)

FOREIGN PATENT DOCUMENTS

| CA | 2 338 553 A1 | 11/2000 |
| DE | 10 2010 016 011 A1 | 9/2011 |

(Continued)

OTHER PUBLICATIONS

Mechanical dry pulverizing machine, Turbo Mill, Japan, Nov. 2010, pp. 4,5,7.

*Primary Examiner* — Jose Fortuna
(74) *Attorney, Agent, or Firm* — Global IP Counselors, LLP

(57) ABSTRACT

A defibration unit includes a rotating unit and a fixing unit. The rotating unit and the fixing unit are arranged so as to be apart from each other with a gap therebetween in a direction that intersects with a rotating shaft of the rotating unit. The fixing unit includes a plurality of plates that are layered in an axial direction of the rotating shaft, and the plates has a plurality of convexities that protrude at a side facing the rotating unit.

2 Claims, 7 Drawing Sheets

Related U.S. Application Data continuation of application No. 14/488,885, filed on Sep. 17, 2014, now Pat. No. 9,422,664.

(51) Int. Cl.
*B02C 4/00* (2006.01)
*B29B 15/00* (2006.01)
*D21B 1/06* (2006.01)
*B02C 18/14* (2006.01)
*B29L 7/00* (2006.01)

(52) U.S. Cl.
CPC ............ *B02C 18/146* (2013.01); *B29B 15/00* (2013.01); *D21D 5/24* (2013.01); *B29L 2007/002* (2013.01)

(58) Field of Classification Search
CPC .. B02C 7/04; B02C 7/11; B02C 7/175; B02C 13/26; B02C 15/006; B02C 2013/2869; D21B 1/02; D21B 1/06; D21D 5/24; D21D 1/30; D21D 1/306; B29B 17/0412; B29B 2017/0488; B29B 15/00
See application file for complete search history.

(56) References Cited

U.S. PATENT DOCUMENTS

| | | | |
|---|---|---|---|
| 3,482,791 A | 12/1969 | Alliegro | |
| 4,202,505 A | 5/1980 | Ruuskanen | |
| 6,637,682 B2 | 10/2003 | Akiyama et al. | |
| 7,300,540 B2 | 11/2007 | Sabourin et al. | |
| 7,455,252 B2 * | 11/2008 | Nara | B02C 7/06 241/189.1 |
| 7,713,381 B2 | 5/2010 | Sabourin et al. | |
| 7,735,760 B2 | 6/2010 | Hanson et al. | |
| 7,753,297 B2 | 7/2010 | Hanson et al. | |
| 7,861,959 B2 | 1/2011 | Eriksen | |
| 8,882,965 B2 | 11/2014 | Yamagami et al. | |
| 9,309,622 B2 | 4/2016 | Higuchi | |
| 9,422,664 B2 * | 8/2016 | Higuchi | D21D 5/24 |
| 9,428,859 B2 * | 8/2016 | Higuchi | B02C 4/10 |
| 9,428,862 B2 | 8/2016 | Higuchi et al. | |
| 2012/0259451 A1 | 10/2012 | Konning et al. | |
| 2014/0290884 A1 | 10/2014 | Yamagami et al. | |
| 2014/0290890 A1 | 10/2014 | Seki et al. | |
| 2014/0374047 A1 | 12/2014 | Yamagami | |
| 2015/0096701 A1 * | 4/2015 | Higuchi | B02C 4/10 162/261 |
| 2015/0096702 A1 * | 4/2015 | Higuchi | D21D 5/24 162/261 |
| 2015/0240417 A1 | 8/2015 | Higuchi | |
| 2015/0251867 A1 | 9/2015 | Higuchi et al. | |
| 2015/0252530 A1 | 9/2015 | Higuchi et al. | |
| 2015/0275429 A1 | 10/2015 | Higuchi et al. | |
| 2015/0275430 A1 | 10/2015 | Higuchi et al. | |
| 2016/0145801 A1 | 5/2016 | Fujita et al. | |
| 2016/0145802 A1 | 5/2016 | Higuchi | |
| 2016/0145803 A1 | 5/2016 | Higuchi | |
| 2016/0332336 A1 * | 11/2016 | Higuchi | D21D 5/24 |

FOREIGN PATENT DOCUMENTS

| | | | | |
|---|---|---|---|---|
| JP | 52-144407 A | | 12/1977 | |
| JP | 06-093585 A | | 4/1994 | |
| JP | 2008-031578 A | | 2/2008 | |
| JP | 2012-144819 A | | 8/2012 | |
| JP | 2012-144825 A | | 8/2012 | |
| JP | 2012-144826 A | | 8/2012 | |
| JP | 2013-522015 A | | 6/2013 | |
| JP | 2015074849 A | * | 4/2015 | ............... B02C 4/10 |
| JP | 2016185622 A | * | 10/2016 | |
| WO | 00/71810 A1 | | 11/2000 | |

* cited by examiner

DEFIBRATION UNIT

CROSS-REFERENCE TO RELATED APPLICATIONS

This application is a continuation application of U.S. patent application Ser. No. 15/219,990, filed on Jul. 26, 2016, now U.S. Pat. No. 9,643,339, which is a continuation application of U.S. patent application Ser. No. 14/488,885, filed on Sep. 17, 2014, now U.S. Pat. No. 9,422,664. This application claims priority to Japanese Patent Application No. 2013-211677 filed on Oct. 9, 2013. The entire disclosures of U.S. patent application Ser. Nos. 15/219,990 and 14/488,885, and Japanese Patent Application No. 2013-211677 are hereby incorporated herein by reference.

BACKGROUND

Technical Field

The present invention relates to a sheet manufacturing apparatus and a defibration unit.

Related Art

In the field of sheet manufacturing, a process for conversion into a sheet is generally preceded by a process for converting a material serving as a stock material into fibers (a defibration process). At present, a wet method using a large amount of water is what is mainly used in such a defibration step. As such, steps for water removal, drying, and the like become needed after the sheet has been formed. The added need for water, power, and large-scale utilities such as drainage equipment also makes it difficult to reduce the size of a sheet manufacturing apparatus. Therefore, it has been increasingly difficult to meet the demands of recent years for energy conservation, environmental protection, and the like.

A method where absolutely or substantially no water is used, called a dry method, has been anticipated as a method of manufacturing a sheet in place of such a conventional method of papermaking, but the current state of manufacturing sheets has not yet seen any technique that is necessary adequately established for dry manufacturing with consistency to the point of changing from the stock material to a sheet, which is the final product. The act of disaggregating a stock material such as used paper or pulp by a dry method is generally called defibration.

Japanese laid-open patent publication No.2008-031578 discloses a rotating body for scratch-defibration intended to defibrate a continuous body of defibration object, such as a synthetic resin, and obtaining a cotton-like material. The rotating body of Japanese laid-open patent publication No. 2008-031578 is obtained when disks having saw-toothed protruding bodies are stacked and arranged so as to have such an incline that the saw-toothed protruding bodies have a helical shape. According to Japanese laid-open patent publication No. 2008-031578, a distal end part of the blades of the rotating body is set so as to have a thickness of 0.1 mm or less, and an attempt was made to obtain a cotton-like material by having the blades cut into the defibration object (see Japanese laid-open patent publication No. 2008-031578, paragraph [0026]).

However, when the features described in Japanese laid-open patent publication No. 2008-031578 are used and a rotating body is rotated in a state where blades are made to cut into a defibration object composed of the entanglement of fibers or a defibration object obtained when fibers are bound together, then the original fibers end up being shredded by the blades, and many of the resulting fibers are of a shorter fiber length than the original fiber length.

When a sheet is manufactured by such fibers of short fiber length, then there is a concern that there would be fewer fixing points where one fiber fixes to another fiber, and that the strength of the resulting sheet is not adequate.

SUMMARY

One of the objectives according to several aspects of the present invention is to provide a sheet manufacturing apparatus having a defibration unit for defibrating a defibration object, in which defibration unit it is possible to defibrate without excessively reducing the fiber length and to manufacture a sheet having a strength that is suitable for practical use, as well as to provide such a defibration unit.

The present invention has been made in order to solve the above problems at least in part, and can be implemented as the following aspects or application examples.

According to one aspect of the invention, a defibration unit includes a rotating unit and a fixing unit. The rotating unit and the fixing unit are arranged so as to be apart from each other with a gap therebetween in a direction that intersects with a rotating shaft of the rotating unit. The fixing unit includes a plurality of plates that are layered in an axial direction of the rotating shaft, and the plates has a plurality of convexities that protrude at a side facing the rotating unit.

According to the aspect of the invention, the plates of the fixing unit are layered such that the convexities of adjacent plates among the plates are contacted to each other.

BRIEF DESCRIPTION OF THE DRAWINGS

Referring now to the attached drawings which form a part of this original disclosure.

DETAILED DESCRIPTION OF EXEMPLARY EMBODIMENTS

Several embodiments of the present invention shall be described below. The embodiments described below are illustrative examples of the present invention. The present invention is in no way limited by the following embodiments, and comprises a variety of modified forms that are implemented within a scope where the essence of the present invention is not modified. The configurations described below are not necessarily all essential configurations of the present invention.

1. Sheet Manufacturing Apparatus

A sheet manufacturing apparatus 1000 shall be described below, with reference as appropriate to FIGS. 1-8.

Figure 1:
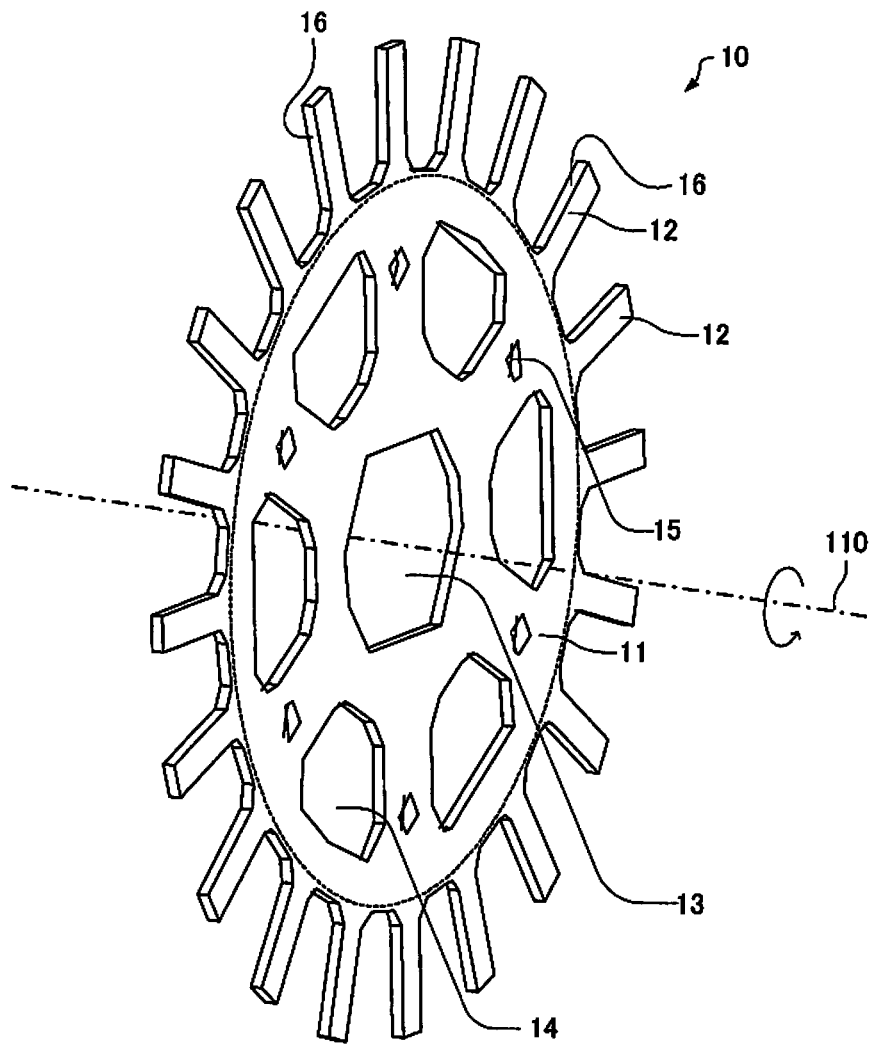
FIG. 1 is a schematic view illustrating a rotating plate according to an embodiment.
Figure 2:
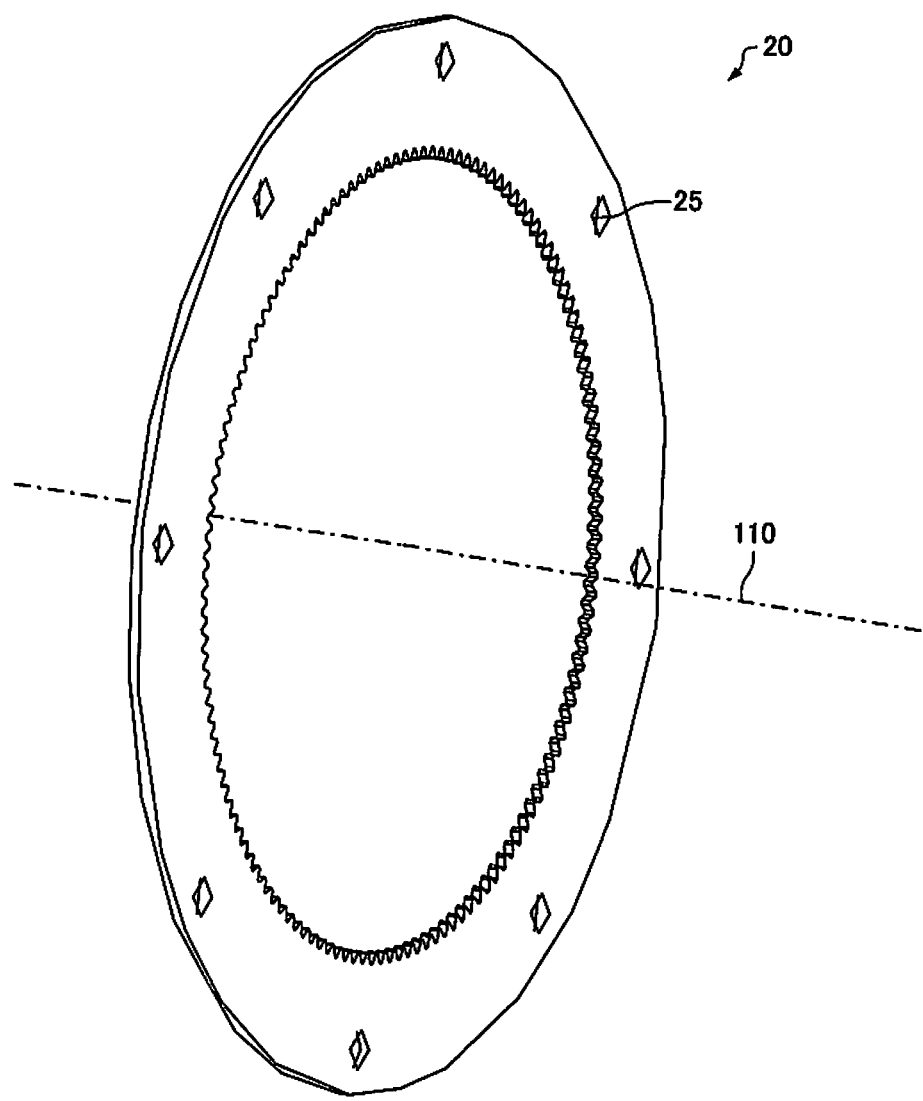
FIG. 2 is a schematic view illustrating a fixing plate according to an embodiment.
Figure 3:
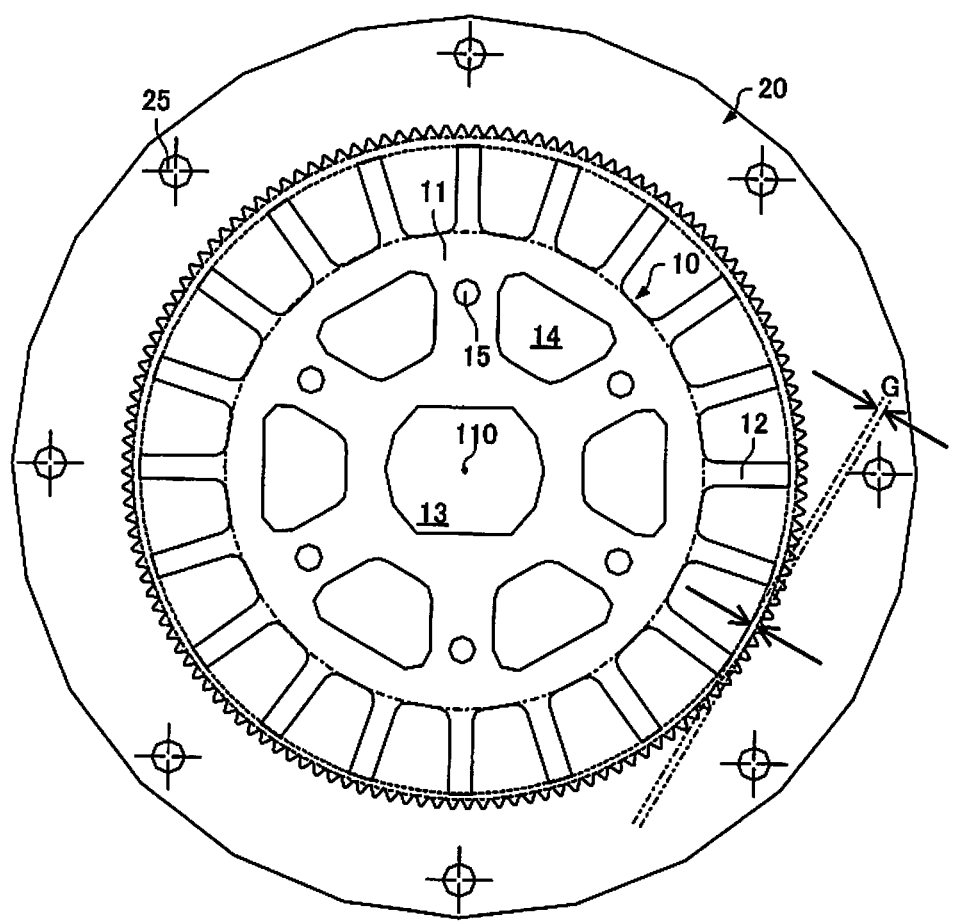
FIG. 3 is a schematic view illustrating a rotating plate and a fixing plate according to an embodiment, in plan view.
Figure 4:
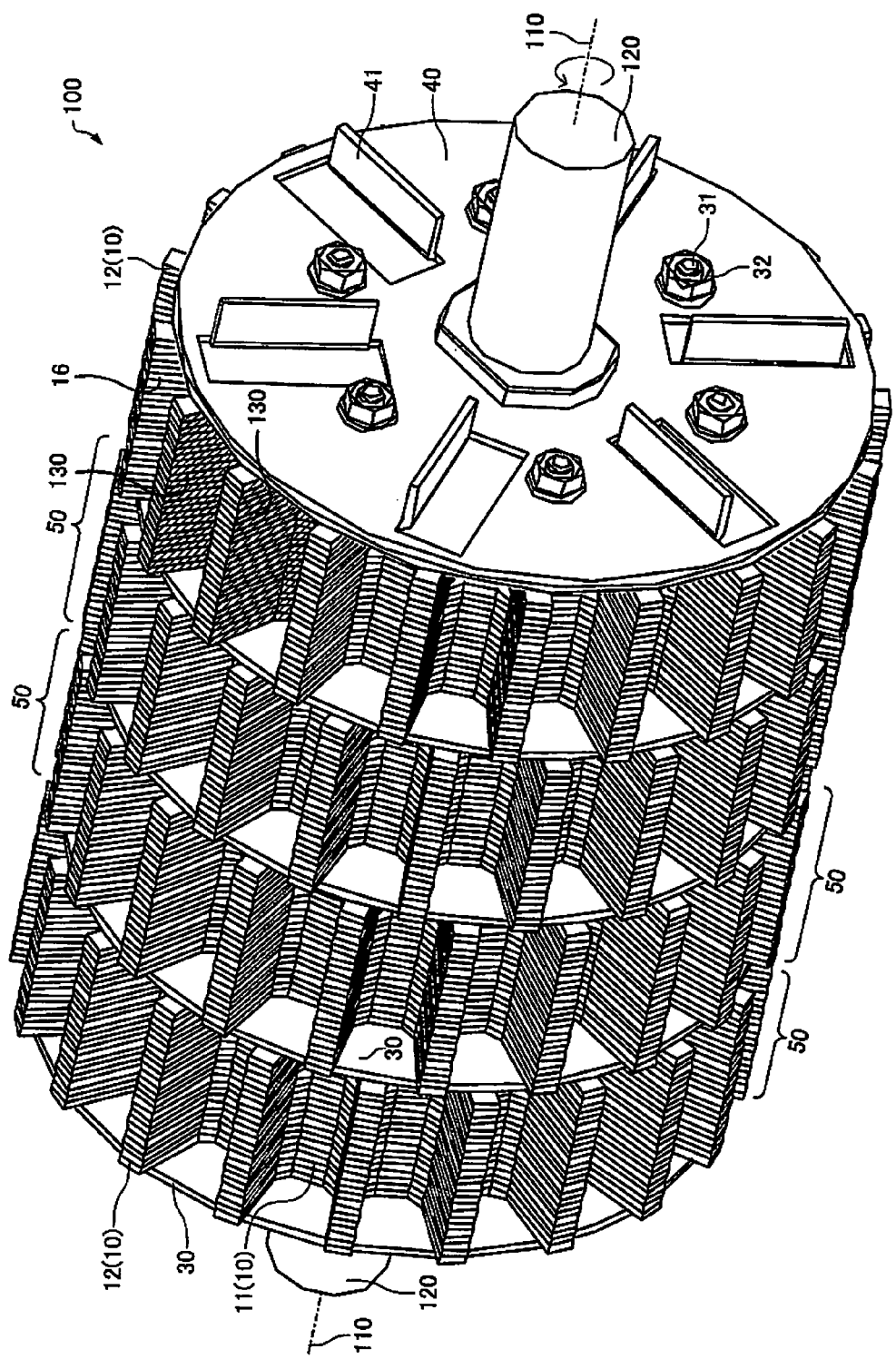
FIG. 4 is a schematic view illustrating a rotating unit according to an embodiment.
Figure 5:
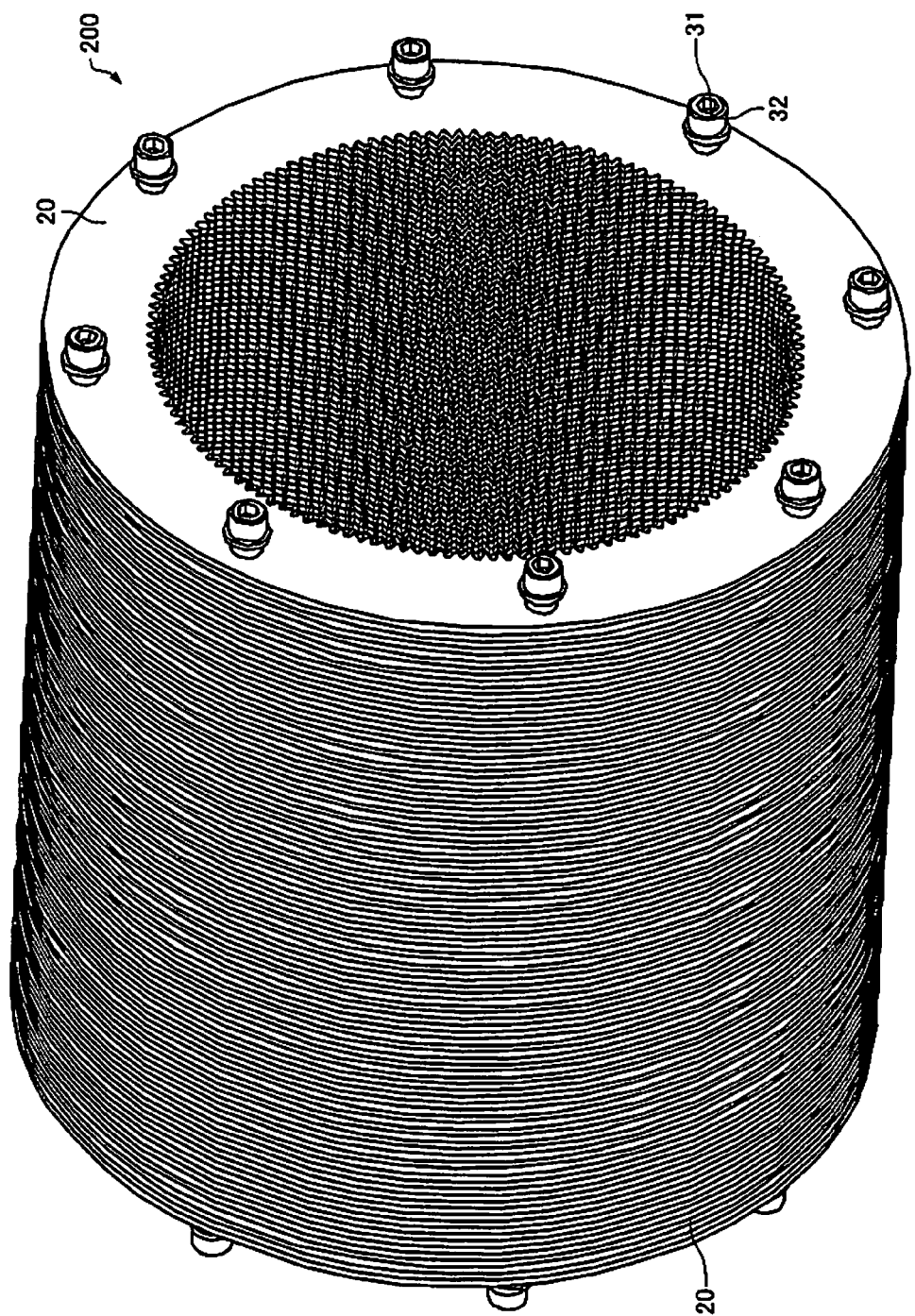
FIG. 5 is a schematic view illustrating a fixing unit according to an embodiment.
Figure 6:
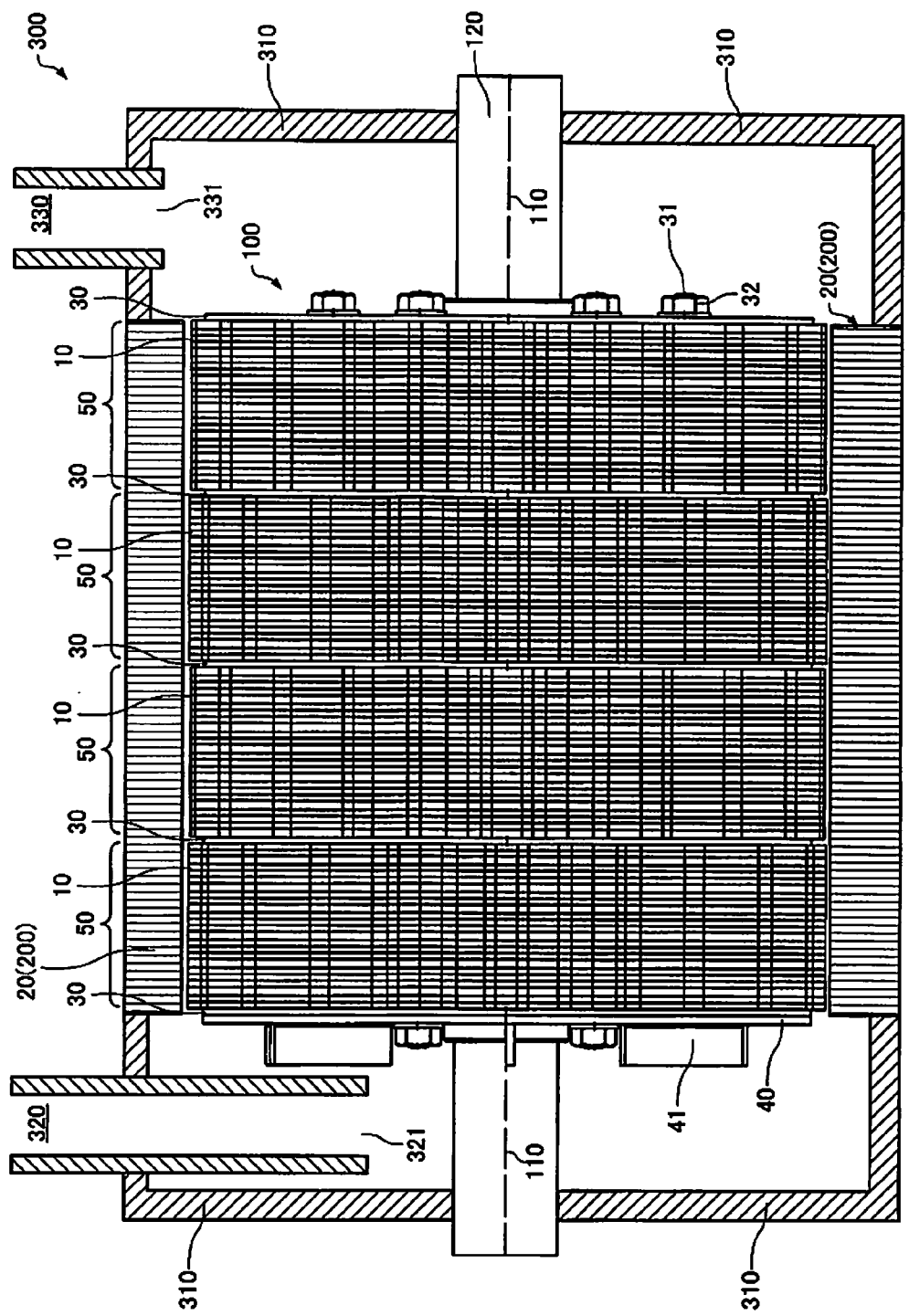
FIG. 6 is a schematic view illustrating a partial cross-section of a defibration unit according to an embodiment.
Figure 7:
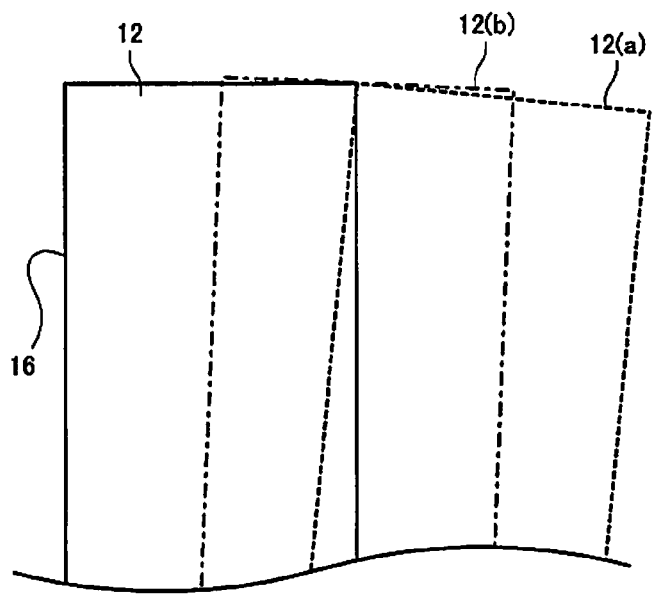
FIG. 7 is a schematic view providing an enlarged illustration of the vicinity of a projecting part of a rotating plate according to an embodiment.
Figure 8:
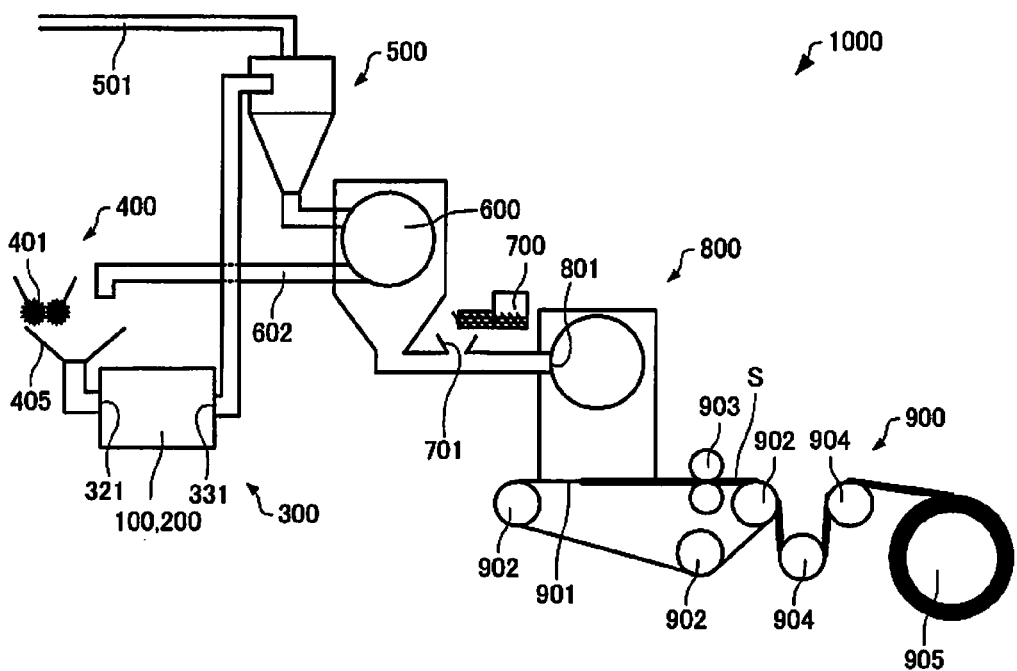
FIG. 8 is a drawing schematically illustrating a sheet manufacturing apparatus according to an embodiment.

FIG. 1 is a schematic view illustrating a rotating plate 10 of a rotating unit 100. FIG. 2 is a schematic view illustrating a fixing plate 20 of a fixing unit 200. FIG. 3 is a schematic view where the rotating plate 10 and the fixing plate 20 are seen in plan view, and illustrates a state where the rotating plate 10 is arranged on the inside of the fixing plate 20. FIG. 4 is a schematic view illustrating the rotating unit 100. FIG. 5 is a schematic view illustrating the fixing unit 200. FIG. 6 is a schematic view illustrating a partial cross-section of a defibration unit 300. FIG. 7 is a schematic view providing an enlarged illustrating of the vicinity of a protruding section 12 of the rotating plate 10. FIG. 8 is a schematic view illustrating the sheet manufacturing apparatus 1000 of the present embodiment.

In the present specification, a "defibration object" refers to something obtained when fibers are entangled or bound together, such as pulp sheets, paper, used paper, non-woven fabric, fiber board, tissue paper, kitchen paper, cleaners, filters, liquid-absorbing materials, sound absorbers, cushioning materials, or mats. Such fibers could include natural fibers (animal fibers or plant fibers), chemical fibers (organic fibers, inorganic fibers, or organic/inorganic composite fibers), or the like, and more specific examples may include fibers composed of cellulose, silk, wool, cotton, hemp, kenaf, flax, ramie, jute, Manila hemp, sisal hemp, softwood, hardwood, or the like, or fibers composed of rayon, lyocell, cupro, vinylon, acrylic, nylon, aramid, polyester, polyethylene, polypropylene, polyurethane, polyimide, carbon, glass, or metal. A defibration object may include any one of these fibers independently, or may be a mixture of a plurality of kinds of fibers.

Also, in the present specification, "dry" signifies in air and not in a liquid. The category of "dry" encompasses a dry state as well as a state where a liquid present as an impurity or an intentionally added liquid is present.

1.1. Defibration Unit

As illustrated in FIGS. 4, 6 and 8, the sheet manufacturing apparatus 1000 as in the present embodiment includes the defibration unit 300. The defibration unit 300 of the sheet manufacturing apparatus 1000 as in the present embodiment has a rotating unit 100, and dry-defibrates a defibration object by rotating the rotating unit 100. The defibration unit 300 of the present embodiment also has a fixing unit 200.

The defibration unit 300 dry-defibrates the defibration object. By defibrating the defibration object, the defibration unit 300 generates fibers that have been disentangled into the form of fibers. "Defibration" or a "defibration process" refers to a process which attempts to disentangle, fiber by fiber, the defibration object that is formed when a plurality of fibers are bound together. In the present specification, what has passed through a gap G (described below) belonging to the defibration unit 300 is in some instances referred to as "defibrated material".

The defibration unit 300 of the present embodiment has the rotating unit 100, such as is illustrated in FIGS. 4 and 6, configured so as to comprise a plurality of rotating plates 10. Also, the defibration unit 300 of the present embodiment comprises the fixing unit 200 such as is illustrated in FIGS. 5 and 6, configured so as to comprise a plurality of fixing plates 20, and takes a configuration where the rotating unit 100 rotates on the inside of the fixing unit 200 about a rotating shaft 120.

1.1.1. Rotating Unit

As illustrated in FIG. 4, the rotating unit 100 comprises the plurality of rotating plates 10. The number of rotating plates 10 belonging to the rotating unit 100 is not limited, provided that the number is a plurality. The rotating unit 100 has a structure where a plurality of at least two rotating plates 10 are stacked in contact with one another onto the rotating shaft 120, in the direction in which the rotating shaft 120 extends. Also, as illustrated in FIG. 4, there may be other members such as partition plates 30 stacked in the rotating unit 100, in which case the rotating plates 10 need not all be stacked in contact with one another.

The rotating plates 10, as illustrated in FIGS. 1 and 3, are plate-shaped members and are provided with a base section 11 that is positioned on a central rotation axis 110 side, and a plurality of protruding sections 12 that are provided projecting out in a direction drawing away from the central rotation axis 110 from the base section 11. The central rotation axis 110 is an imaginary line that, when the rotating unit 100 is rotating, is positioned at the center thereof and passes through the vicinity of the center of gravity of the rotating plates 10. Being rotated about the central rotation axis 110 by the rotating shaft 120, the rotating plates 10 are therefore preferably formed so as to have a balance of weight with respect to the central rotation axis 110.

The base sections 11, as depicted, have an engaging hole 13 that is fitted to the rotating shaft 120 and allows the rotating plates 10 to rotate along with the rotation of the rotating shaft 120. The base sections 11 also have a plurality of reduced material sections 14 for reducing the weight of the rotating plates 10. The base sections 11 also have formed there a plurality of bolt holes 15 for maintaining the plurality of rotating plates 10 in the stacked state.

The protruding sections 12 of the rotating plates 10, as depicted, as protrusions that are substantially rectangular when see in plan view (see FIG. 3), and are provided projecting radially outward toward the outside from the central rotation axis 110. The number of protruding sections 12 is not particularly limited, provided that the ability for the defibration process is not adversely affected. In the example illustrated in FIGS. 1 and 3, there are 20 protruding sections 12 provided at equal intervals to the rotating plates 10.

A portion that is a distal end of the protruding sections 12 (i.e., that is the position most removed from the central rotation axis 110) and is the distal end of the side of forward advancement in rotation (a distal end portion of the side that collides with the defibration object because of the rotation of the rotating unit 100) has a shape that does form a pointed, sharp tip. As depicted, a surface that is the distal end of the protruding sections 12 and is of the side of forward advancement in rotation is substantially rectangular, and forms a surface where an air flow is generated when the rotating plates 10 are stacked. That is to say, preferably, the thickness of the distal end parts of the protruding sections 12 is not reduced, but rather when this distal end of the protruding sections 12 is contacted with the defibration object, then the shape is such that such an action as would cut into the defibration object is curbed. When the shape of the distal end of the protruding sections 12 is one that is less prone to cut into the defibration object, then cutting of the fibers included in the defibration object is curbed, and therefore any shortening of the fibers of the defibrated material that passes through the defibration unit 300 can be curbed. Adopting such a shape also makes it possible to enhance the action of striking and unraveling the defibration object. Adopting such a shape also makes it possible to curb the action of mashing the defibration object.

Also, in the example depicted, there are six of the reduced material sections 14 and six of the bolt holes 15 formed in the base sections 11 of the rotating plates 10, but it suffices for the appropriate number thereof to be provided in accordance with need. Also, the base sections 11 in the example depicted have a substantially circular shape as seen in plan view, but may instead be a polygon or a shape that includes a curve. Also, although not depicted, protrusions or guides for adjusting positions may be formed for the members stacked onto the rotating plates 10 (includes adjacent rotating plates 10), and these protrusions or guides may be provided projecting out in the thickness direction of the rotating plates 10.

The thickness of the rotating plates 10 is not particularly limited. The respective thicknesses of the base sections 11 and protruding sections 12 of the rotating plates 10 may be the same or may instead be difference, but if the thickness are different, then preferably the protruding sections 12 are thicker so that the protruding sections 12 that belong respectively to adjacent rotating plates 10 can come into contact with one another. The base sections 11 and the protruding sections 12 of the rotating plates 10 preferably have the same thickness, because then manufacture by pressing or the like is easily done. The thickness of the protruding sections 12 is the same from the base section 11 side until the distal end. The base sections 11 and the protruding sections 12 of the rotating plates 10 may be formed integrally, or may be formed as separate bodies with the protruding sections 12 being arranged so as to protrude out from the base sections 11 by an appropriate means. In the present specification, the thickness of the rotating plates 10 (includes the base sections 11 and the protruding sections 12) refers to the dimension of the rotating plates 10 in the direction in which the rotating shaft 120 extends.

Possible examples of the material of the rotating plates 10 include stainless steel, high-hardness steel, ceramics, cemented carbide, precipitation hardening stainless steel, or the like. The base sections 11 and the protruding sections 12 may be formed of mutually different materials. Also, after having been formed with a predetermined material, the rotating plates 10 may be subjected to a process for hardening the surfaces by gas nitriding, plating, or the like. The hardening treatment may also be carried out after each of the plates has been stacked. So doing makes it possible to reduce the material used in the hardening treatment. The rotating plates 10 can be formed by using a press to punch out a cold-rolled steel plate, steel strips (SPCC, SPCD, SPCE, SPCF, SPCG), or the like.

When the rotating unit 100 is formed by stacking the rotating plates 10, the fact that formation by pressing is possible, as described above, means that the rotating unit can be formed more efficiently than forming the rotating unit by casting or cutting. With pressing, the positions of the above-mentioned reduced material sections 14 and bolt holes 15 can also be modified as appropriate, and therefore it is also possible to easily accommodate a mode (described below) where the protruding sections 12 are arranged with offset. Moreover, when the rotating unit 100 is formed by stacking the rotating plates 10, it is easy to make the thickness (the length in the direction running along the rotating shaft 120) be a predetermined thickness.

The size of the rotating plates 10 can be determined as appropriate depending on the processing capabilities of the defibration unit 300 or the like. The size of the base sections 11 is also not particularly limited with respect also to the length with which the protruding sections 12 protrude out from the base sections 11 or the like. The distance from the central rotation axis 110 until the distal end of the protruding sections 12 is the same in a plurality of protruding sections 12, however. This causes the distal ends of each of the protruding sections 12 to trace a trajectory forming substantially the same circle when the rotating unit 100 rotates, and therefore makes it possible to keep the size of spacing from the fixing unit 200 (a gap G, described below) substantially constant over the entire circumference.

In the rotating unit 100, the rotating plates 10 are stacked so that the protruding sections 12 that respectively belong to adjacent rotating plates 10 are in contact in the direction in which the central rotation axis 110 (rotating shaft 120) extends. In a case where the partition plates 30 (described below) are employed, as illustrated in FIG. 4, then the stacking need not be such that the protruding sections 12 are in contact.

Here, stacking so that two protruding sections 12 are in contact refers to a case where two protruding sections 12 are arranged with no spacing between in the direction in which the rotating shaft 120 extends. However, in practice there are also instances where dimensional errors, warpage, or the like in each of the members causes a slight spacing to be produced in the arrangement. Even in a case where a spacing is produced, there is no problem provided that the spacing be of such an extent that fibers are unlikely to enter in, and therefore spacings of such an extent are understood to be encompassed by a mode of stacking so as to be in contact. When there is stacking so that two protruding sections 12 are in contact, it suffices for only a part to be stacked until the distal end of a plane intersecting with the direction of extension of the rotating shaft 120 of each of the two protruding sections 12. That is to say, in a case where two rotating plates 10 are stacked so that the two protruding sections 12 respectively belonging to each are in contact, then the stacking may be such that those two protruding sections 12 are in contact with the angles offset from one another along the circumferential direction of the rotating shaft 120.

The direction of offset in a case of stacking with offset protruding sections 12 is optional, irrespective of the direction of rotation, and is designed as appropriate in accordance with the type of defibration object and other conditions.

In a case of stacking with the protruding sections 12 offset in the circumferential direction, then the degree (angle) of this offset is of such an extent as to not produce a spacing at the distal end parts of the protruding sections 12 as seen from the direction running along the rotating shaft 120. FIG. 7 is a schematic view providing an enlarged view of protruding sections 12 belonging to rotating plates 10. In a case of arranging with offset protruding sections 12, then offset greater than what is illustrated with the broken line (reference symbol 12(a)) illustrated in FIG. 7 is not preferable because a spacing is produced at the distal end portions of the protruding sections 12 and there is consequently more likely to be an action such as would cut the defibration object. Offset within a range smaller than the width of the distal end portions of the protruding sections 12, as illustrated with the one-dot chain line (reference symbol 12(b)) illustrated in FIG. 7, however, makes it possible to prevent a spacing from being produced at the distal end portions of the protruding sections 12 as seen from the direction running along the rotating shaft 120. In a case of arranging with offset protruding sections 12, also, the degree of this offset (the angle of offsetting) is more preferably smaller than one-half of the width of the distal end portions of the protruding sections 12.

A protruding section side surface 16 shall also be defined, with reference to FIG. 7. Namely, as illustrated in FIG. 7, the protruding section side surface 16 is defined as being a surface that connects the surface with which the thickness of the protruding sections 12 is prescribed, and that is of the side of forward advancement in rotation.

As stated above, the rotating shaft 120 has a structure with which the protruding sections 12 of the rotating plates 10 are stacked in the direction in which the rotating shaft 120 extends. This causes opposing surfaces 130 that advance forward toward the direction in which the rotating unit 100 rotates to be formed by the protruding section side surfaces 16 of protruding sections 12 that respectively belong to the stacked rotating plates 10 (see FIG. 4). These opposing surfaces 130 are formed with the protruding section side surfaces 16 forming a continuation due to the stacking of the protruding sections 12. The formation of such surfaces makes it possible to give rise to the effect of striking (striking and unraveling) the defibration object that has been introduced to the defibration unit 300 in a case where the rotating unit 100 is rotated. In the above-mentioned case of stacking with offset protruding sections 12, then the opposing surfaces 130 will be a spiral staircase-like surface configured to comprise surfaces perpendicular to the rotating shaft 120, appearing due to the offsetting of the protruding sections 12 as well as the protruding section side surfaces 16.

The rotating unit 100 includes the rotating shaft 120, which is perpendicular to the plane of the rotating plates 10. The rotating shaft 120 can be rotated about the central rotation axis 110 by an external driving apparatus such as a motor (not shown). Rotating the rotating shaft 120 makes it possible to cause the rotating plates 10 to rotate. In the depiction, the rotating shaft 120 has an outer diameter shape that can be fitted into the engaging holes 13 of the rotating plates 10. Another configuration may be employed for the rotating shaft 120 and the rotating plates 10, provided that the rotating plates 10 can be made to rotate by rotating the rotating shaft 120.

The size of the rotating unit 100 in the direction running along the rotating shaft 120 is not particularly limited, within a range where the action by which the defibration object is defibrated can be exerted in a case where the defibration object has been introduced to the defibration unit 300 and the rotating unit 100 is rotated. The size of the rotating unit 100 in the direction running along the rotating shaft 120 can be adjusted by modifying the thickness of the rotating plates 10, the number of rotating plates 10 that are stacked, or the like.

As illustrated in FIGS. 4 and 6, the rotating unit 100 is configured so as to have four step sections 50 in each of which there are 24 rotating plates 10 stacked, with five partition plates 30 stacked between and at both ends of each of the step sections 50. In this example, the rotating plates 10 all have the same shape and the same thickness. Here, the protruding sections 12 of the rotating plates 10 that constitute one of the step sections 50 are stacked substantially without offset along the circumference, and in adjacent step sections 50, each of the protruding sections 12 is arranged so as to be offset along the circumferential direction. The partition plates 30 are arranged between adjacent step sections 50. For this reason, within each of the step sections 50, the protruding sections 12 are stacked so as to be in contact, and at the portions where the partition plates 30 are arranged, the protruding sections 12 are arranged so as not to be in contact. This rotating unit 100 has bolts 31 and nuts 32 that fasten the rotating plates 10, the partition plates 30, and a blade plate 40 (described below) together.

Because the stacking in the rotating unit 100 is such that the plurality of rotating plates 10 are in contact, the rotating plates 10 are easy to replace, and the time and effort in maintenance in the event of failure can be reduced, as can the costs of replacement, compared to a case where the rotating plates 10 are formed integrally.

1.1.2. Fixing Unit

As illustrated in FIGS. 5, 6, and 8, the defibration unit 300 of the present embodiment includes the fixing unit 200. The fixing unit 200 is arranged spaced apart from the rotating unit 100 in the direction of drawing away from the central rotation axis 110. The surface of the fixing unit 200 on the central rotation axis 110 side has corrugation along the circumference of the rotating unit 100.

The fixing unit 200 may be constituted of a single member or may be constituted of a plurality of members.

As illustrated in FIG. 5, the fixing unit 200 is formed of the plurality of fixing plates 20.

The fixing plates 20, as illustrated in FIGS. 2 and 3, are plate-shaped members and have a shape that is annular as seen in plan view. Corrugations are formed at the inside surface of the rings of the fixing plates 20, by projecting out in the direction going toward the central rotation axis 110 from the annular portion as seen in plan view. These corrugations are formed at equal intervals, and have the same distance between a distal end (central rotation axis 110 side) of each convexity and the central rotation axis 110. Likewise, the distances between the bottoms of the concavities that are between each of the convexities (the side away from the central rotation axis 110) and the central rotation axis 110 are the same. Then, as illustrated in FIG. 3, a surface enveloping an inside surface of the fixing plates 20 is becomes the outside, as seen from central rotation axis 110, beyond the surface of the trajectories traced by when the protruding sections 12 of the rotating plates 10 rotate. In other words, in plan view, the radius of the circle inscribed on the inside surface of the fixing plates 20 is larger than the radius of the circle that is traced by when the protruding sections 12 of the rotating plates 10 rotate.

In the present specification, the distance found by subtracting the radius of the circle that is traced by when the protruding sections 12 of the rotating plates 10 rotate from the radius of the circle inscribed on the inside surface of the fixing plates 20 in plan view is called a gap G (see the reference symbol G in FIG. 3).

Preferably, in plan view, the surface enveloping the inside surface of the fixing plates 20 is circular and the center of this circle matches with the central rotation axis 110 of the rotating unit 100, with consideration given to assembly errors. So doing makes it possible to perform the defibration process more stably, because the size of the gap G formed by the rotating unit 100 and the fixing unit 200 does not vary significantly in the circumferential direction of the rotating shaft 120.

The fixing plates 20 have formed thereon a plurality of bolt holes 25 for holding the plurality of fixing plates 20 in the stacked state, as illustrated in FIGS. 2 and 3. Here, there are eight bolt holes 25 formed in the fixing plates 20, but it suffices only for an appropriate number to be provided in accordance with need; in a case where the fixing plates 20 are stacked by another means, then in some instances the bolt holes 25 would be unnecessary.

The outside shape of the fixing plates 20 has a substantially circular shape as seen plan view in the depiction, but may instead be a polygon or a shape that includes a curve. When the outside shape of the fixing plates 20 is uneven, then in some instances air-cooling of the defibration unit 300 could be accelerated. Also, although not depicted, protrusions or guides for adjusting positions may be formed for the members stacked onto the fixing plates 20 (includes adjacent fixing plates 20), and these protrusions or guides may be provided projecting out in the thickness direction of the fixing plates 20.

The thickness of the fixing plates 20 is not particularly limited. The thicknesses of the fixing plates 20 and the rotating plates 10 may be the same or may be different. In a case where the thickness of the fixing plates 20 and the thickness of the rotating plates 10 are the same, then when the two are manufactured by press-punching from the same raw material (for example, a steel plate), then the two can be manufactured at the same time, and therefore the dimensional precision and productivity can be improved. In particular, excellent dimensional precision can be obtained for the gap G. The thickness of the fixing plates 20 is preferably the same in each of the portions within the fixing plates 20. In the present specification, the thickness of the fixing plates 20 refers to the dimension of the fixing plates 20 in the direction in which the rotating shaft 120 extends, in a case where the rotating unit 100 has been arranged.

The size of the fixing plates 20 can be determined as appropriate depending on the processing capabilities of the defibration unit 300, the gap G from the rotating plates 10, and the like.

The material of the fixing plates 20 can be similar to what is described in the section on the rotating plates 10. The fixing plates 20 can be formed by using a press to punch out a cold-rolled steel plate, steel strips (SPCC, SPCD, SPCE, SPCF, SPCG), or the like.

In the fixing unit 200, the fixing plates 20 are stacked so that adjacent fixing plates 20 are in contact in the direction in which the central rotation axis 110 (the rotating shaft 120) extends. In FIG. 5, 101 fixing plates 20 formed at the same thickness as the rotating plates 10 are stacked so as to be in contact.

The number of fixing plates 20 belonging to the fixing unit 200 of the present embodiment is not limited, provided that the number is a plurality. The number of fixing plates 20 may be the same as or different from the number of rotating plates 10. In the present embodiment, the fixing unit 200 has a structure stacked so that the plurality of fixing plates 20 are contacted in the direction in which the rotating shaft 120 extends, onto the rotating shaft 120 of the rotating unit 100. Therefore, as illustrated in FIG. 5, the fixing unit 200 takes a straight tubular shape such that a central axis is present on an inner surface that is corrugated.

The fixing plates 20, when stacked, are stacked so that the corrugations on the inside that are formed respectively in adjacent fixing plates 20 are in contact with one another. Therefore, the corrugations belonging respectively to the stacked fixing plates 20 form grooves, which represent corrugations when the circumferential direction is traced, on the central rotation axis 110-side surface (inner surface) of the fixing unit 200. The shape and size of these corrugations are the same in FIG. 5, but may instead be different amongst the corrugations. With the corrugations formed on the inner surface in FIG. 5, because the stacking is such that the corrugations of adjacent fixing plates 20 are not offset in the circumferential direction, grooves that are parallel in the direction in which the rotating shaft 120 extends are formed on the inner surface of the fixing unit 200. Though not depicted, the corrugations formed on the inner surface may instead having stacking such that the corrugations of adjacent fixing plates 20 are offset in the circumferential direction, in which case grooves that are inclined with respect to the direction in which the rotating shaft 120 extends (helical grooves) would be formed on the inner surface of the fixing unit 200. The mode of the grooves of the inside surface of the fixing unit 200 can be modified as stated above, but could be designed optionally in accordance with the type of defibration object, the structure of the rotating unit 100, or other such conditions.

The corrugations formed on the central rotation axis 110-side surface of the fixing unit 200 have the function of producing such an air flow as to disentangle the defibration object that has entered into the gap G in a case where the rotating unit 100 is rotated inside the fixing unit 200. In the case where the rotating unit 100 is rotated inside the fixing unit 200, when the protruding sections 12 pass through the vicinity of the concavities of the corrugations as seen from the central rotation axis 110 side, an air flow as would rotate inside the concavities is produced, and the defibration object is defibrated by this air flow.

The shape of the corrugations formed on the inside surface of the fixing unit 200 is optional, as is the shape of the corrugations formed on each of the fixing plates 20, provided that the action described above can be achieved. There is also no particular restriction to the roughness of the corrugations formed on the inside surface of the fixing plates 20, which may be substantially even; alternatively, such fixing plates 20 may be stacked along with fixing plates 20 that have rough corrugations, and the stacking order of such fixing plates 20 is likewise not limited in any way.

The convexities of the corrugations formed on the central rotation axis 110-side surface of the fixing plates 20 are more preferably not a sharp-pointed shape. For example, the convexities may be trapezoidal, with a flat part formed at the distal ends thereof. In a cause where the convexities become thinner toward the distal end and are sharp, by way of example, in some instances the convexities could cut into the defibration object in a case where the rotation of the rotating unit 100 causes the defibration object to collide with the convexities. With convexities such as are illustrated in FIG. 3, where the angle of the distal end is about 60°, then even were the convexities to have sharp-pointed distal ends, the defibration object colliding therewith would more readily collide from the side surface side of the convexities than collide from the central rotation axis 110 side because of the rotation of the rotating unit 100, and therefore such a shape is also allowed. That is to say, provided that the shape is such that the convexities are not likely to cut into the defibration object upon being contacted with the defibration object, any cutting thereby of the fibers included in the defibration object is curbed, and therefore any shortening of the fibers of the defibrated material that passes through the defibration unit 300 can be curbed. Adopting such a shape also makes it possible to enhance the action of striking and unraveling the defibration object.

The size of the fixing unit 200 in the direction running along the rotating shaft 120 is not particularly limited, within a range within a range where the action by which the defibration object is defibrated can be exerted in a case where the defibration object has been introduced to the defibration unit 300 and the rotating unit 100 is rotated. The size of the fixing unit 200 in the direction running along the rotating shaft 120 can be adjusted by modifying the thickness of the fixing plates 20, the number of fixing plates 20 stacked, or the like. The size of the fixing unit 200 in the direction running along the fixing unit 200 may be the same as or different from the size of the rotating unit 100 in the direction running along the rotating shaft 120.

As illustrated in FIG. 5, the fixing unit 200 of the present embodiment is configured with 101 fixing plates 20 of the same thickness and the same shape stacked together. The rotating plates 10 (24 plates×4 (step sections)=96 plates) and partition plates 30 (five plates) constituting the rotating unit 100 are stacked with the same thickness.

As such, the number of fixing plates 20 that are stacked in the fixing unit 200 and the number of members that are stacked in the rotating unit 100 are the same, and the thicknesses are the same. Therefore, the sizes of the rotating unit 100 and the fixing unit 200 in the direction running along the rotating shaft 120 are the same as one another. This fixing unit 200 has bolts 31 and nuts 32 that fasten the fixing plates 20 together.

In a case where the fixing unit 200 adopts a mode where the plurality of fixing plates 20 are stacked so as to be in contact, then the fixing plates 20 are easy to replace, and the time and effort in maintenance in the event of failure can be reduced, as can the costs of replacement, compared to a case where the fixing plates 20 are formed integrally.

1.1.3. Structure of Defibration Unit

The defibration unit 300 of the present embodiment, as illustrated in FIG. 6, includes the above-described rotating unit 100 and the above-described fixing unit 200. In FIG. 6, the fixing unit 200 is drawn with the cross-section traced schematically and the corrugations of the inside surface omitted. The rotating unit 100 is arranged in the space that is inside the fixing unit 200, and is supported by the rotating shaft 120 inside the fixing unit 200.

The rotating shaft 120 is suspended with support at both ends by bearings (not shown), and can be freely rotated by a driving mechanism (not shown). Possible examples of such a driving mechanism include a mechanism where the rotating shaft 120 is rotated directly by a rotor or a mechanism where the rotating shaft 120 is rotated via a power transmission apparatus such as a belt and pulley, a chain and sprocket, or gear.

A cover 310 is provided to the defibration unit 300 of FIG. 6, at both ends in the direction in which the rotating shaft 120 extends. Here, the cover 310 closes off the two ends of the fixing unit 200 in the direction in which the rotating shaft 120 extends in a state where the rotating shaft 120 can be penetrated through, and in the interior there is formed a space for accommodated the defibration object or the defibrated material. The size of this space is not particularly limited. Here, provided are an input pipe 320 and outlet pipe 330 that have communication with the space formed by the cover 310. Also, here, the blade plate 40 is attached to an input pipe 320-side end part of the rotating unit 100 in the direction running along the rotating shaft 120, and blade sections 41 where a part of the blade plate 40 is erected rising in the direction running along the rotating shaft 120 are provided.

The input pipe 320 is piping for introducing the defibration object to the defibration unit 300, and the output pipe 330 is piping for discharging from the defibration unit 300 the defibrated material that has been defibrated by the rotating unit 100 (a rotor 90).

In the depiction, an inlet opening 321 that is a distal end of the input pipe 320 is found near the rotating shaft 120, and an outlet opening 331 that is a distal end of the output pipe 330 is found at a position apart from the rotating shaft 120, but there is no limitation to being such a mode, and each of the pipes can be arranged as appropriate. The blade sections 41 are arranged herein on the input pipe 320 side of the rotating unit 100, but may instead be arranged on the output pipe 330 side.

The blade sections 41 have at least the action of causing the defibration object or the defibrated material to move from the input pipe 320 side toward the output pipe 330 side, but are not necessarily a requisite configuration in such a case as where a wind feed mechanism or wind suction mechanism such as a blower or fan is provided to one or both ends from the input pipe 320 side to the output pipe 330 side. In this example, the blade sections 41 take a shape where, as illustrated in FIG. 4, six places on the blade plate 40 stacked so as to be adjacent to a partition plate 30 are bent and are erected rising in the direction running along the rotating shaft 120. There is, however, no limitation to being such a shape, and the blade sections 41 may be arranged by welding to the partition plate 30 or the like. The shape of the blade sections 41 is likewise not limited, and an arbitrary shape can be adopted. In a case where the blade plate 40 is able to block the reduced material sections 14 of the rotating plates 10, then the blade plate 40 can double as the function of the partition plates 30, in which case it would be possible not to install the partition plates 30 on the side to which the blade plate 40 is provided.

1.1.4. Operation of Defibration Unit

In that rotating the rotating shaft 120 causes the rotating unit 100 to rotate and introduces the defibration object to the gap G between the rotating unit 100 and the fixing unit 200, which is described above with reference to FIG. 3, because of the air flow, the defibration unit 300 is thereby able to dry-defibrate the defibration object. The rotational speed (rotations per minute (rpm)) of the rotating unit 100 can be set as appropriate, taking conditions into consideration such as the throughput of the dry defibration process, the residence time of the defibration object, the extent of defibration, and the size and shape of the rotating unit 100, the fixing unit 200, and each of the other members. In the defibration unit 300 of the structure that is illustrated in FIG. 6, for example, the rotational speed is 100 to 11,000 rpm, preferably 500 to 9,000 rpm, more preferably 1,000 rpm to 8,000 rpm. The rotational speed also need not necessarily be constant, and may be accelerated, decelerated, or the like in accordance with a variety of conditions as appropriate.

1.1.5. Residence Time of Defibration Object in Defibration Unit

The defibration object is introduced from the input pipe 320 of the defibration unit 300 and discharged as the defibrated material from the output pipe 330 that is illustrated in FIG. 6. The residence time (that is to say, the duration during which the defibration object is present in the gap G which is described above with reference to FIG. 3) of the defibration object in the gap G between the rotating unit 100 and the fixing unit 200 at this time is set in consideration of the type of defibration object. The residence time is also set with consideration likewise given to the rotational speed of the rotating unit 100, the configurations, shapes, and sizes of the rotating unit 100 and the fixing unit 200, and other such balances.

In a case where the defibration object has properties making defibration difficult, where the other conditions are the same, then setting a longer residence time is preferable. Conversely, in a case where the defibration object has properties making defibration easy, where the other conditions are the same, then setting a shorter residence time is preferable. In turn, the length of the residence time could also be modified in a case where the defibration object is a predetermined one but the extent to which the defibrated material should be disentangled or the throughput is being modified, or the like. When the rotational speed or the quantity of air being passed through is to be reduced (when the capabilities of the blower (wind feed mechanism) are being lowered and the moving speed of the defibration object is being reduced), the residence time is generally longer, making it possible to further enhance the defibration action, but the following method makes it possible to lengthen the residence time even in a case where the rotational speed or quantity of air is held constant.

Of the means for lengthening the residence time, the following are included as relating to the shapes of the rotating unit 100 and the fixing unit 200. (1) Increasing the thickness or number of rotating plates 10 and fixing plates 20, and lengthening the distance from the input pipe 320-side end of the gap G to the output pipe 330-side end; (2) arranging the protruding sections 12 of the rotating plates 10 in at least some of the step sections 50 with angles offset in the circumferential direction of the rotating shaft 120, to lengthen the residence time inside some of the step sections 50 because of the rotation of the rotating unit 100; (3) provided the partition plates 30 to the rotating unit 100 and forming a barrier for the defibration object to move; (4) increasing the number of step sections 50 (that is to say, the number of partition plates 30) in the case of (3); and (5) changing the shape or size of the blade sections 41 and reducing the moving speed of the defibration object.

When the residence time is longer, the dry defibration process performed by the defibration unit 300 can be more reliably carried out. Also, according to the defibration unit 300 of the present embodiment, there is little action of cutting or mashing the fibers produced from the defibration object, and therefore even when the residence time is lengthened, the fibers included in the defibrated material still will not be too short. This makes it possible to amply increase the strength of the sheet that is ultimately manufactured.

1.1.6. Step Sections

The rotating unit 100 belong to the defibration unit 300 of the present embodiment has the step sections 50. The step sections 50 are formed of the stack of the plurality of rotating plates 10 and the partition plates 30 that are stacked at both ends thereof. The partition plates 30 are arranged between adjacent step sections 50. The number of step sections 50 formed in the rotating unit 100 is optional. As illustrated in FIGS. 4 and 6, there are four step sections 50 formed in the present embodiment. In the rotating unit 100 of the present embodiment, the respective step sections 50 are in some instances named so as to progress from a first step section to a fourth step section, starting from the input pipe 320 side.

The rotating plates 10 belonging to one of the step sections 50, as stated above, are stacked so as to be in contact with one another. In turn, the partition plates 30 arranged between the step sections 50 are provided so as to be in contact with the rotating plates 10, but have flat plate shape representing a circle that is the same as or smaller than the circle traced by the distal ends of the protruding sections 12 of the rotating plates 10 in a case where the rotating shaft 120 is rotated. That is to say, the size of the partition plates 30 is the same as that of the distal ends of the protruding sections 12 of the rotating plates 10 or is inside of the distal ends of the protruding sections 12.

The material and thickness of the partition plates 30 can be similar to those of the rotating plates 10. The partition plates 30 may have reduced material sections or bolt holes. In the case where the rotating plates 10 have the reduced material sections 14, then the partition plates 30 provided to those partition plates 30 at the end parts of the rotating unit 100 in the direction running along the rotating shaft 120 are shaped so as to cover and block off portions of the reduced material sections 14 of the rotating plates 10.

The shape of the partition plates 30 blocks off at least part of a groove extending in the direction running along the rotating shaft 120 that is formed by the stacking of the protruding sections 12 of the rotating plates 10, and may even block off all of these grooves. The partition plates 30 are shaped so as not to be more outward from the central rotation axis 110 than the protruding sections 12 of the rotating plates 10.

Providing the partition plates 30 and forming the plurality of step sections 50 results in the action of the partition plates 30 causing the defibration object to move through the vicinity of the distal ends of the protruding sections 12 upon moving to the adjacent step section 50. Therefore, compared to a case where there are no partition plates 30, the defibration object passes through the vicinity of the distal ends of the protruding sections 12 with greater frequency and the defibration process can be performed more reliably. As stated above, providing the partition plates 30 makes it possible to lengthen the residence time of the defibration object and therefore makes it possible for the defibration process to be carried out even more reliably.

1.1.7. Gap

The "gap G" refers to the length found by subtracting the radius of the circle that is traced by when the protruding sections 12 of the rotating plates 10 rotate from the radius of the circle inscribed on the inside surface of the fixing plates 20 when the rotating unit 100 is installed on the inside of the fixing unit 200 (see FIG. 3).

In the defibration unit 300 of the present embodiment, the gap G is set so as to be larger than the thickness of the defibration object. Because the gap G is larger than the thickness of the defibration object, cutting is curbed and mashing is curbed when the defibration object enters the gap (the spacing between the rotating unit 100 and the fixing unit 200). Preferably, the size of the gap G is about two- to 300-fold the thickness of the defibration object.

The gap between the rotating unit 100 and the fixing unit 200 can be adjusted as appropriate by modifying the outside diameter of the rotating plates 10 or the inside diameter of the fixing plates 20.

In the defibration unit 300 described above, the protruding sections 12 are stacked so as to be in contact in the direction in which the rotating shaft 120 extends, and therefore the opposing surfaces 130 formed by the plurality of protruding sections 12 are formed in a direction (direction intersecting with the thickness direction of the rotating plates 10) intersecting with the direction in which the protruding sections 12 are stacked. Then, rotation of the rotating unit 100 causes these opposing surfaces 130 to advance in the direction of rotation, making is possible to cause the defibration object to collide and also forming a high-speed air flow in the direction of rotation. This curbs the action of cutting the fibers produced from the defibration object and makes it possible to defibrate the defibration object so as to prevent the fibers of the resulting defibrated material from being too short.

1.2. Other Configurations

The sheet manufacturing apparatus 1000 as in the present embodiment has a configuration with which at least some of the defibrated material that passes through the defibration unit 300 described above is deposited and heated.

The sheet manufacturing apparatus 1000, as illustrated in FIG. 8, comprises a crushing unit 400, the defibration unit 300, a classifier unit 500, a screening unit 600, a resin supplying unit 700, an untangling unit 800, and a sheet forming unit 900.

Pulp sheets or a stock material such as sheets that is inserted (for example, A4-sized used paper) are cut in air by the crushing unit 400 and made into scraps. Though not particularly limited, the shape or size of the scraps are, for example, scraps of several centimeters square. In the example depicted, the crushing unit 400 has crushing blades 401, and the crushing blades 401 make it possible to cut the stock material that is fed in. An automatic feeding unit (not shown) for continuously feeding the stock material in may be provided to the crushing unit 400. The crushing unit 400 is provided as needed, and need not necessarily be provided in a case where a stock material not requiring cutting is being used. The crushing unit 400 is not for defibrating but instead is for cutting, and even though a slight defibrating action may take place, has a function different from the defibration process (a process for disentangling into fibers) that is carried out in the defibration unit 300. Specific illustrative examples of the crushing unit 400 could include a shredder.

The scraps that are cut up by the crushing unit 400 are received at a hopper 405 and introduced from the inlet opening 321 of the defibration unit 300. The defibration unit 300 defibrates the scraps (defibration object). By defibrating the scraps, the defibration unit 300 generates the defibrated material, which has been disentangled into fibers. By being made into scraps at the crushing unit 400, the defibration object is more readily defibrated in the defibration unit 300. Also, by being made into scraps at the crushing unit 400, the defibration object more readily passes through the gap G and enters in between the protruding sections 12 of the rotating plates 10. The defibrated material thus generated is discharged from the outlet opening 331 and introduced into the classifier unit 500.

The classifier unit 500 separates out and removes resin particles, ink particles, or the like as needed from the defibrated material. An air flow-type classifier is used as the classifier unit 500. An air flow-type classifier is one that generates a whirling air current and separates by centrifugal force and the size and density of what is being classified; adjusting the speed of the air flow and the centrifugal force makes it possible to adjust the classification point. More specifically, a cyclone, an elbow jet, an eddy classifier, or the like is used as the classifier unit 500. In particular, a cyclone has a simple structure and can therefore be suitably used as the classifier unit 500.

The defibrated material that is classified at the classifier unit 500 is introduced into the screening unit 600. Unwanted material that is separated out at the classifier unit 500 is discharged to the exterior of the classifier unit 500 by way of a discharge pipe 501. In a case where used paper is the stock material, then resin particles or the like are discharged to the exterior by way of the discharge pipe 501, and therefore resin can be prevented from being excess in relation to the defibrated material even though a resin may be supplied by the resin supplying unit 700 (described below). The classifier unit 500 may also be eliminated from the sheet manufacturing apparatus 1000 in a case such as where the stock material is not used paper but instead pulp sheets.

The screening unit 600 screens the defibrated material that has been defibrated by the defibration unit 300 into "passing material" that passes through the screening unit 600 and "residual material" that does not pass therethrough. A variety of sieves could be used as the screening unit 600. In the screening unit 600, fibers of a length that is able to pass through the openings of the sieve can be screened from the defibrated material that has been defibrated and can then be passed through. The screening unit 600 is not an essential configuration but rather is provided in accordance with the state of the defibrated material necessary for the sheets being manufactured. The residual material that does not pass through the screening unit 600, being in a state of inadequate defibration or long fibers, may be transported to the hopper 405 via a returning flow path 602 and again returned to the defibration unit 300, as illustrated in FIG. 8.

The passing material that has passed through a first opening 42 of the screening unit 600 is transported to an introduction port 801 of the untangling unit 800 via the resin supplying unit 700. Provided to the resin supplying unit 700 is a supply port 701 by which the resin for causing the fibers to bind to one another is supplied.

The resin supplying unit 700 supplies the resin in air from the supply port 701. Namely, the resin supplying unit 700 supplies resin to a pathway (between the screening unit 600 and the untangling unit 800) going from the screening unit 600 toward the untangling unit 800. Though not particularly limited, provided that the resin can be supplied to the pathway of transportation, a screw feeder, cycle feeder, or the like is used as the resin supplying unit 700. The defibrated material and the resin are then mixed together.

The resin that is supplied from the resin supplying unit 700 is a resin for causing a plurality of the fibers to bind together.

At the point in time where the resin is supplied to the pathway, the plurality of fibers have not been bound together. The resin hardens upon passing through the sheet forming unit 900 (described below), thus causing the plurality of fibers to bind together.

The resin that is supplied from the resin supplying unit 700 is a thermoplastic resin or thermosetting resin. The resin that is supplied from the resin supplying unit 700 may be in the form of fibers or may be in the form of a powder. The amount of resin that is supplied from the resin supplying unit 700 is set as appropriate in accordance with the type of sheet being manufactured. Other than the resin for causing the disentangled fibers to bind together, a coloring agent for coloring the disentangled fibers or an aggregation-preventing material for preventing aggregation of the disentangled fibers may also be supplied, depending on the type of sheet being manufactured.

The untangling unit 800 unravels the passing material that has been intertwined. The untangling unit 800 also unravels resin that is intertwined in a case where the resin that is supplied from the resin supplying unit 700 is in the form of fibers. The untangling unit 800 uniformly deposits the passing material and resin onto a deposition unit (described below).

A sieve can be used as the untangling unit 800. The fibers and resin having passed through the untangling unit 800 is deposited onto the deposition unit (described below) at uniform thickness and density. The untangling unit 800 is not necessarily an essential configuration in such cases as where intertwined fibers are not present or where fibers are intentionally deposited while intertwined without being unraveled.

The defibrated material and resin having passed through the untangling unit 800 is deposited onto the accumulation section 901 of the sheet forming unit 900. The sheet forming unit 900, as illustrated in FIG. 8, has the accumulation section 901, stretching rollers 902, heating rollers 903, tension rollers 904, and a winding roller 905. The sheet forming unit 900 uses the defibrated material and resin having passed through the untangling unit 800 to form a sheet S. The sheet forming unit 900 shall be described in greater detail below.

The accumulation section 901 of the sheet forming unit 900 receives the deposited defibrated material and resin having passed through the untangling unit 800. The accumulation section 901 is located below the untangling unit 800. The accumulation section 901 is for receiving the defibrated material and the resin and is, for example, a mesh belt. Formed in the mesh belt is a mesh that is stretched out by the stretching rollers 902. The accumulation section 901 is moved by when the stretching rollers 902 turn. While the accumulation section 901 is moving continuously, the defibrated material and the resin are continuously falling down and piling up from the untangling unit 800, and this causes a web of uniform thickness to be formed on the accumulation section 901.

The defibrated material and resin that have been deposited onto the accumulation section 901 of the sheet forming unit 900 are heated and compressed by being passed through the heating rollers 903 in association with the movement of the accumulation section 901. The heating causes the resin to function as a binder and bind the fibers to one another, and the compression reduces thickness; passing through the tension rollers 904, the surface is smoothed and the sheet S is formed.

In the example depicted, the sheet S is taken up at the winding roller 905.

The foregoing makes it possible to manufacture the sheet S.

The sheet that is manufactured by the sheet manufacturing apparatus 1000 refers primarily to something that has been made into the shape of a sheet. There is no limitation to being sheet-like, however, and the sheet may be board-like or web-like. The sheet in the present specification can be divided into paper or non-woven fabric. Paper encompasses modes where pulp or used paper, as a stock material, is formed into a thin sheet, or the like, and encompasses recording paper, wallpaper, wrapping paper, colored paper, picture paper, Kent paper, or the like where writing or printing is the objective. Non-woven fabric is thicker or of lower strength than paper, and encompasses non-woven fabric, fiber board, tissue paper, kitchen paper, cleaners, filters, liquid-absorbing material, sound-absorbing material, cushioning material, mats, and the like. The stock material may also be cellulose or other plant fibers, polyethylene terephthalate (PET), polyester, or other chemical fibers, or wool, silk, or other animal fibers.

Though not depicted, a water spray for spraying and adding moisture onto the deposited material deposited onto the accumulation section 901 may be provided. This makes it possible to increase the strength of the hydrogen bonds for when the sheet S is formed. The water is sprayed and added to the deposited product that has not yet passed through the heating rollers 903. Starch or polyvinyl alcohol (PVA) or the like may be added to the moisture that is sprayed with the water sprayer. This makes it possible to further increase the strength of the sheet S.

The example above describes a mode where the sheet S is taken up at the winding roller 905, but the sheet S may also be cut to a desired size by a cutting machine (not shown) and stacked onto a stacker or the like.

Words such as "same" or "uniform" in the present application also take processing errors, cumulative errors in the dimensional accuracy of the materials, and the like into account and are understood to also encompass instances that differ within a range of about ±10%.

An embodiment of the present invention has been described above, but the present invention is in no way limited to the embodiment above, and modifications can be made as appropriate within a scope not departing from the essence of the invention.

The sheet manufacturing apparatus 1000 of the present invention is able to manufacture the sheet provided that at least the defibration unit 300 and the sheet forming unit 900 are present. The crushing unit 400, the classifier unit 500, the screening unit 600, the resin supplying unit 700, the untangling unit 800, and the like need only be added to the configuration where needed. "Used paper" in the present application refers mainly to paper that has been printed on, but may also comprise unused paper or paper that has been passed through a printing apparatus without being printed on.

The present invention is in no way limited to the embodiment described above, and a variety of modifications can be further made. For example, the present invention encompasses configurations (for example, configurations where the functions, methods, and results are the same, or configurations where the objectives and effects are the same) that are essentially the same as the configurations described in the embodiment. The present invention also includes any configuration in which the non-essential portions of a configuration described in the embodiments have been replaced. The present invention furthermore encompasses configurations exerting the same effects or configurations able to achieve the same objectives as those of the configurations described in the embodiment. The present invention moreover includes any configuration obtained when a well-known feature is added to the configuration described in the embodiment.

According to one aspect of a sheet manufacturing apparatus of the embodiment comprises a defibration unit configured to cause a rotating unit to rotate and dry-defibrate a defibration object, and at least a part of defibrated material that has been dry-defibrated is deposited and heated to manufacture a sheet. The rotating unit includes a plurality of rotating plates each of which has a base section located on a side of a central rotation axis and a plurality of protruding sections that protrude out in a direction drawing away from the rotational center axis, and the rotating plates are stacked such that the protruding sections are in contact in a direction in which the central rotation axis extends.

With this sheet manufacturing apparatus, because the protruding sections are stacked so as to be in contact in the direction in which the central rotation axis extends in the defibration unit, opposing surfaces formed of a plurality of protruding sections are formed in a direction (a direction intersecting with the thickness direction of the rotating plates) intersecting with the direction in which the protruding sections are stacked. Then, when the rotating unit rotates, this causes these opposing surfaces to rotate so as to advance toward the direction of rotation, causing the defibration object to collide with the opposing surfaces and also causing a high-speed air flow to be formed in the direction of rotation. This curbs an action of cutting the defibration object or the fibers thereof, and makes it possible to defibrate the defibration object so as to prevent the fibers of the resulting defibrated material from being too short. Therefore, a sheet having a sheet suitable for practical usage can be easily manufactured.

In a sheet manufacturing apparatus as in the embodiment, each of the rotating plates may have the base section and the plurality of the protruding sections integrally, and the base section and the plurality of protruding sections may be of the same thickness.

With the sheet manufacturing apparatus of such description, because the base sections and protruding sections of the rotating plates are integral and of the same thickness in the defibration unit, the need for imparting changes in thickness in the whole can be obviated, and when the defibration unit is being manufactured, manufacturing processing such as pressing, laser processing, or wire electric discharge processing can be easily and precisely worked.

In a sheet manufacturing apparatus as in the embodiment, the defibration unit may have the rotating unit and a fixing unit that is spaced away from the rotating unit in a direction drawing away from the central rotation axis, and a central rotation axis-side surface of the fixing unit may have corrugations along the circumference.

With the sheet manufacturing apparatus of such description, the corrugations of the fixing unit and the protruding sections of the rotating unit are arranged face to face in the defibration unit. This makes it possible for rotation of the rotating unit to cause the defibration unit to efficiently defibrate, because of the action of collision against the convexities of the fixing unit and the high-speed air flow in a gap between the fixing unit and the rotating unit.

In a sheet manufacturing apparatus as in the embodiment, the fixing unit may include fixing plates having the corrugations, and the fixing plates are stacked in the direction in which the central rotation axis extends.

With the sheet manufacturing apparatus of such description, the fixing unit of the defibration unit is formed with the stacked fixing plate. This makes it possible to improve the machining accuracy of the fixing unit.

In a sheet manufacturing apparatus as in the embodiment, the rotating plates of the rotating unit and fixing plates of the fixing unit may be of the same material and of the same thickness.

With the sheet manufacturing apparatus of such description, the rotating unit and the fixing unit can be fabricated with pressing or the like at the same time in the defibration unit. This also makes it possible to even more accurately manufacture the rotating unit and the fixing unit, and therefore makes it possible to further enhance the dimensional accuracy of the spacing between the two.

In a sheet manufacturing apparatus as in the embodiment, the rotating unit may include the rotating plates stacked such that the protruding sections of different rotating plates are offset.

According to the sheet manufacturing apparatus of such description, a pathway for the defibration object to pass through can be substantially lengthened inside the defibration unit. Therefore, movement of the defibration object in the central rotation axis direction is curbed, and the residence time inside the defibration unit can be lengthened and the defibration process can be performed more reliably.

In a sheet manufacturing apparatus as in the embodiment, the rotating unit may further include a plurality of step sections where the rotating plates are stacked without offsetting of the protruding sections, and the step sections may be stacked such that the protruding sections are offset.

In the defibration unit of the sheet manufacturing apparatus of such description, opposing surfaces advancing toward the direction of rotating, formed of the plurality of protruding sections, are formed in the step sections, and also these opposing surfaces are provided with offset in the direction running along the central rotation axis, and therefore the action of striking the defibration object is enhanced, and moreover the residence time of the defibration object inside the defibration unit can be lengthened and the defibration process can be carried out more reliably.

In a sheet manufacturing apparatus as in the embodiment, in between the step sections, the rotating unit may further include a partition plate which has the same size as distal ends of the protruding sections or a size that is more inward than the distal ends of the protruding sections.

Because the defibration unit of the sheet manufacturing apparatus of such description has the partition plates, the residence time of the defibration object inside the defibration unit can be lengthened. The presence of the partition plates also makes it possible to more reliably carry out the defibration process because the defibration object passes through the outer periphery of the rotating unit.

One aspect of a defibration unit as in the embodiment is configured to cause a rotating unit to rotate and dry-defibrates a defibration object, the rotating unit includes a plurality of rotating plates with a plurality of protruding sections on an outer circumference, and the rotating plates are stacked in the rotating unit such that the protruding sections are in contact in a direction in which a central rotation axis extends.

With the defibration unit of such description, because the protruding sections are stacked so as to be in contact in the direction in which the central rotation axis extends, opposing surfaces formed of a plurality of protruding sections are formed in a direction (a direction intersecting with the thickness direction of the rotating plates) intersecting with the direction in which the protruding sections are stacked. Then, when the rotating unit rotates, this causes these opposing surfaces to rotate so as to advance in the direction of rotation, causing the defibration object to collide with the opposing surfaces and also causing a high-speed air flow to be formed in the direction of rotation. This curbs the action of cutting the fibers produced from the defibration object and makes it possible to defibrate the defibration object so as to prevent the fibers of the resulting defibrated material from being too short.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A defibration unit configured to cause a rotating unit to rotate inside of a fixing unit and dry-defibrate a material to be defibrated, the defibration unit comprising:
   the rotating unit including a rotating shaft and a plurality of protruding sections, the rotating shaft being located at a side of a central rotation axis of the rotating unit, the protruding sections protruding out in a direction drawing away from the central rotation axis; and the fixing unit including a plurality of plates that are layered in an axial direction of the rotating shaft, the plates having a plurality of convexities that protrude at a side facing the rotating unit, the fixing unit being spaced apart from the rotating unit in a direction perpendicular to the axial direction of the rotating shaft so as to form a gap between the rotating unit and the fixing unit.

2. The defibration unit according to claim 1, wherein the plates of the fixing unit are layered such that the convexities of adjacent plates among the plates are contacted to each other.

\* \* \* \* \*